United States Patent [19]

Randolph

[11] Patent Number: 5,730,870
[45] Date of Patent: Mar. 24, 1998

[54] OIL CHANGE SYSTEM AND METHOD

[76] Inventor: Ovie L. Randolph, 2513 Briarcliff, Irving, Tex. 75062

[21] Appl. No.: 414,949

[22] Filed: Mar. 31, 1995

[51] Int. Cl.⁶ .................................................. B01D 21/02
[52] U.S. Cl. ........................ 210/409; 184/6.24; 123/196 A
[58] Field of Search ................................ 210/409, 411, 210/414; 184/1.5, 6.24; 123/196 A

[56] References Cited

U.S. PATENT DOCUMENTS

| | | |
|---|---|---|
| 1,554,589 | 9/1925 | Long . |
| 1,568,830 | 1/1926 | Gunderson . |
| 1,699,680 | 1/1929 | Sweetland ........................... 210/411 |
| 1,780,663 | 11/1930 | Winslow et al. ....................... 210/411 |
| 2,532,177 | 11/1950 | Maunula .............................. 210/411 |
| 2,657,705 | 11/1953 | Gerhard et al. . |
| 2,919,704 | 1/1960 | Butler ................................... 184/1.5 |
| 3,677,369 | 7/1972 | Schramm . |
| 3,871,483 | 3/1975 | Espinosa et al. . |
| 4,274,645 | 6/1981 | Ferguson et al. . |
| 4,449,613 | 5/1984 | Price . |
| 4,752,387 | 6/1988 | Thomas . |
| 4,776,430 | 10/1988 | Rule . |
| 4,802,599 | 2/1989 | Hill . |
| 4,907,676 | 3/1990 | Shirdavani . |
| 4,995,968 | 2/1991 | Snelling . |
| 5,037,359 | 8/1991 | Hutchins et al. . |
| 5,296,134 | 3/1994 | Zaiter . |
| 5,301,724 | 4/1994 | Maxwell . |
| 5,372,219 | 12/1994 | Peralta . |
| 5,462,679 | 10/1995 | Verdegan et al. .................. 210/411 |

FOREIGN PATENT DOCUMENTS 1233907   5/1986   U.S.S.R. ................ 210/411

Primary Examiner—Thomas E. Denion
Attorney, Agent, or Firm—W. Thomas Timmons; Timmons & Kelly

[57] ABSTRACT

A method and apparatus is disclosed for draining used oil from a motor (M) having a drain hole (12). A valved drain plug (P) is removably mounted in the drain hole (12). A transportable lubricant drain container (C) is adapted to be positioned beneath the vehicle (V) to be drained. The drain container (C) has a handle (16) that is adjustable to correctly position the container (C) beneath the drain hole (12) of the motor (M) depending on the type of vehicle (V). The valved drain plug (P) can be remotely operated to open a passageway (22) through which the used oil drains from the motor (M).

2 Claims, 3 Drawing Sheets

OIL CHANGE SYSTEM AND METHOD

BACKGROUND OF THE INVENTION

1. Technical Field

The invention relates to lubrication systems for automobiles and, more particularly, to systems for changing the lubricant from various types of engines that are either in motorized vehicles or part of other types of apparatus.

2. Background Art

Systems for changing engine oil in motor vehicles and related devices such as used oil storage containers are well established arts. Generally, motored vehicle like automobiles use oil as a lubricant. The oil must periodically be replaced because of degradation of the lubricating capabilities and an accumulation of unwanted acids and debris in the liquid. When it is time to replace the engine oil, first the used oil is normally removed from the engine as completely as possible. A flow filter, typically having paper filter elements, that is in the oil flow circuit in the vehicle is optionally replaced. Then fresh oil is installed in the motor.

In order to drain the used oil from the vehicle, typically a drain bolt or plug that seals a drain hole in the oil pan or oil reservoir of the vehicle must be removed. The placement of the drain hole and the clearance between the motor and the ground often requires the operator or technician to crawl beneath the vehicle. Alternatively, a lifting device can raise the vehicle to permit the technician or mechanic to work standing upright beneath the raised vehicle. Finally, the vehicle can be positioned over a pit in which the mechanic stands to work under the motor.

A variety of containers for the expended oil has been used in the past. These oil storage containers include pans or tubs, and plastic drain bottles or reservoirs that are adapted to catch the oil flowing from the engine and to retain the oil in an interior reservoir. Large movable drums having a funnel attachment have also been used in the past.

It is therefore a feature of this invention to provide an improved system for changing used motor oil that can be performed by the operator without either raising the vehicle or having the operator getting beneath the motor.

It is a further feature of this invention that the replaceable drain plug includes a passageway to permit the draining of the used oil from a motor without removing the drain plug.

It is still a further feature of this invention that it includes an oil storage container that is readily adapted for correct positioning beneath a variety of types or makes of vehicles.

DISCLOSURE OF INVENTION

The invention includes a method and a series of devices that cooperate to permit remote controlled draining of a motored vehicle's used oil. A valved drain plug replaces the drain bolt that is normally found on motors of vehicles that must be lubricated with fluids, such as oil. It is usual for such motors to have reservoirs or oil pans where the engine oil collects, particularly when the motor is not running. A drain hole is formed in the oil pan, normally at the lowest point, that allows gravity to drain substantially all of the oil through the drain hole.

The present inventive system further includes an oil flow filter mountable on an engine with the flow filter having one or more sealable openings to permit back-flushing of the filter elements with a liquid solvent to remove undesired debris and to prolong the useful life of the filter.

Finally, a transportable oil drain container is disclosed. The oil drain container is adapted to be placed beneath the motor and has at least one internal oil reservoir to collect the oil that is drained from an engine. An upright handle is coupled to the container. The handle can be adjusted depending on the specific vehicle to be drained of oil such that when the handle engages a selected position of the vehicle, the drain container is properly located beneath the drain hole in the motor.

BRIEF DESCRIPTION OF DRAWING(S)

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

Figure 7:
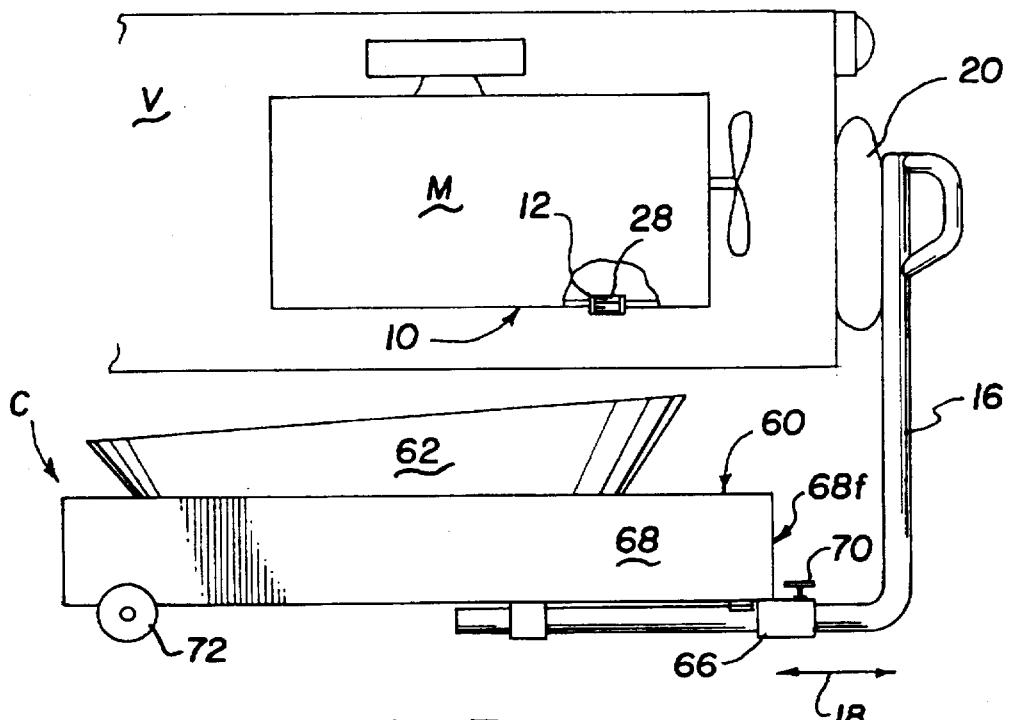
FIG. 7 is a side view of the transportable fluid container having a vehicle in position for release of the fluid lubricant.

Referring in general to FIG. 7, the present invention includes a method and a series of devices cooperating to permit remote controlled draining of used oil from a motored vehicle V. A valved drain plug replaces the drain bolt normally found on vehicles, such as cars having internal combustion engines that must be lubricated with fluids, such as oil. It is usual for motors to have reservoirs or oil pans 10 where the engine oil collects. A drain hole 12 is formed in the oil pan 10, normally at the lowest point allowing for gravity to drain substantially all of the oil through the drain hole 12.

The present inventive system further includes an oil flow filter F having one or more sealable openings 13a and 13b to permit back-flushing of the filter elements with a liquid solvent to remove undesired debris and to prolong the useful life of the filter F.

Finally, a transportable oil drain container C is disclosed. The oil drain container C is adapted to be placed beneath the motor M and has at least one oil reservoir 14a and 14b to collect the oil that is drained from an engine M. An upright handle 16 is coupled to the container C that can be adjusted depending on the specific vehicle V to be drained of oil such that when the handle 16 engages a selected position of the vehicle V, such as the front bumper 20, the drain container C is properly located directly beneath the drain hole 12 in the motor M.

A. Valved Drain Plug

Referring now in particular to FIGS. 1 through 4, a valved lubricant drain plug P is shown for a motorized device V that uses replaceable fluid lubricant held in a reservoir 10 in the motor M. The motor M further includes a drain hole 12 through which the fluid lubricant is removed from the reservoir 10 of the motor M. The drain plug P comprises a removable plug body 20 that is adapted to be mounted in the drain hole 12 in the motor M. The plug body 20 has a passageway 22 therethrough for the fluid lubricant to flow from the reservoir 10 out of the motor M. A valve 24 controllably opens the passageway 22 to communicate the fluid lubricant from the reservoir 10 of the motor M.

The valved plug P includes a thread 26 for mounting the plug to mate with a complementary thread 28 (FIG. 6) brined in the drain hole 10 of the motor M. Also, the valved plug P should be constructed from materials chosen to withstand the heat and other conditions to which the plug P is exposed in the engine M.

Figure 1:
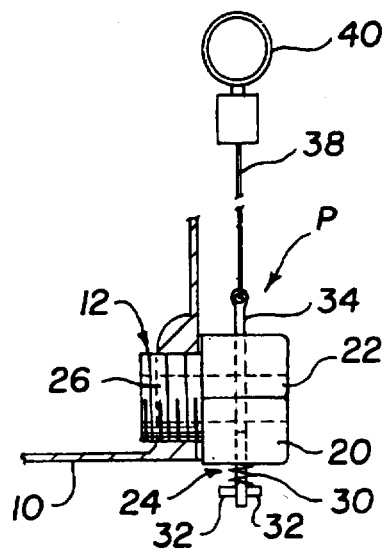
FIG. 1 is side view of the valved drain plug of the present invention having a slidable valve body.
Figure 2:
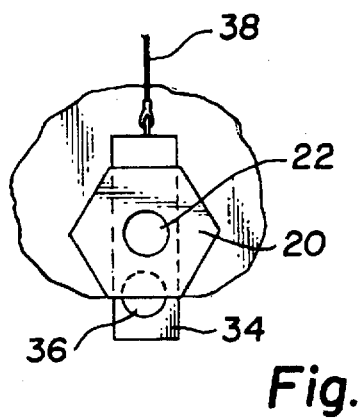
FIG. 2 is a view from the bottom of a valved drain plug of the present invention installed in the drain hole of a motor.

The valve 24 may further include a spring 30 restrained by a stop 32 to move a valve body 34. The valve body 34 is shown as a slide in FIGS. 1 and 2 and has a hole 36 therethrough to pass the oil. The spring 30 and stop 32 act together to maintain the valve body 34 in a normally closed position shown in FIG. 2. An arm 38 is attached to the valve body 34 to move the valve body 34 to an open position in which the hole 36 is in line with the passageway 22 for draining the lubricant from the reservoir 10 of the motor M. In FIG. 1 a pull ring 40 is shown extending from the end of the arm 38 to permit the mechanic to grasp the pull ring 40 and to open the normally closed valve 24.

Figure 5:
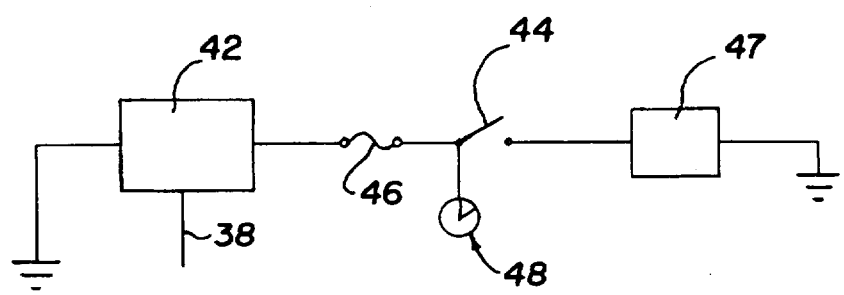
FIG. 5 is a schematic diagram of the control circuit for a motorized embodiment of the present invention.

Referring to FIG. 5, a plug motor 42 may alternatively be operably connected to the arm 38 of the valve 24. A switch 44 in electrical communication would activate the plug motor 42 by opening or closing the electrical circuit to controllably open or close the valve 24. A fuse 46 would act normally to control overloading or an undesired state with the power supply 47 in the electrical circuit. Alternatively, the switch 44 may include or be regulated by a timer 48 to optionally control the opening of the valve 24 in accordance with a selected schedule by replacing the switch 44 as shown in FIG. 5. The timer 48 should be adjusted to maintain the valve 24 in an open position for a selected period of time that roughly corresponds to the typical time it takes for the oil to drain through the valved drain plug P. Then once the operator accesses the switch 44 or initially activates the timer 48, the valve 24 would be automatically closed when the oil is completely drained without further intervention by the operator.

Figure 3:
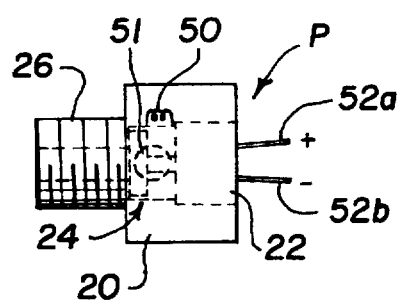
FIG. 3 is an alternative embodiment of the valved drain plug having a solenoid operating the valve.

A further alternative embodiment is depicted in FIG. 3 in which the valved drain plug P of the present invention includes a solenoid 50 with electrical leads 52a and 52b that is adapted for selectively operating a valve body 34 between an open and a closed position in the passageway 22 through the removable valved plug P.

Figure 4:
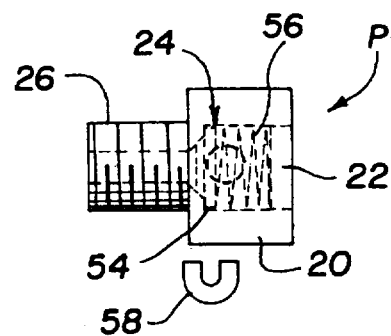
FIG. 4 is yet another alternative embodiment of the present valved drain plug having a magnetically operable valve body.

FIG. 4 is yet another alternative in which the valve 24 includes a magnetically operable valve body 54. A spring 56 maintains the valve body 54 in a normally closed position. When a compatible magnet 58 is positioned next to the magnetized valve body 54, the magnet 58 is moved to withdraw the magnetic valve body 54 out of the closed position, thereby allowing the flow of the oil past the valve body 54.

B. Transportable Fluid Drain Container

A transportable fluid lubricant drain container C is adapted for receiving a stream of a fluid, such as a lubricant, flowing from a position above the container C. The drain container C generally includes an upper fluid receiving surface 60 and at least one inner reservoir 14a or 14b for containing the fluid. The upper fluid receiving surface 60 is formed having a pan 62 to collect and direct the stream of fluid toward a selected opening 64a or 64b in the upper surface 60 for communicating the fluid therethrough into the selected inner reservoir 14a or 14b.

The container C is further adapted for placement beneath a device from which the fluid is to be drained M. A handle 16 is adjustably coupled with sleeve 66 to the container C for assistance in moving the drain container C to a selected position beneath the device from which the fluid is to be drained M. The handle 16 extends generally upright from the container C to engage the vehicle V at a selected location on the vehicle, such as at a specific location on the vehicle's front bumper 20. The handle 16 may be adjusted relative to the front 68 for the body 68 for the drain container C along the line 18 and locked in position with a nut 70, in accordance with the type of the vehicle V, to position the container C at an optimal selected location beneath the vehicle V. The prior adjustment of the handle 16 based on the type of vehicle V involved allows for rapid and accurate placement of the drain container C beneath the drain hole 12 of the motor M.

The transportable fluid lubricant drain container C may optionally have one or more wheels 72 mounted with the body 68 of the container C for ease in movement of the container C.

Figure 6:
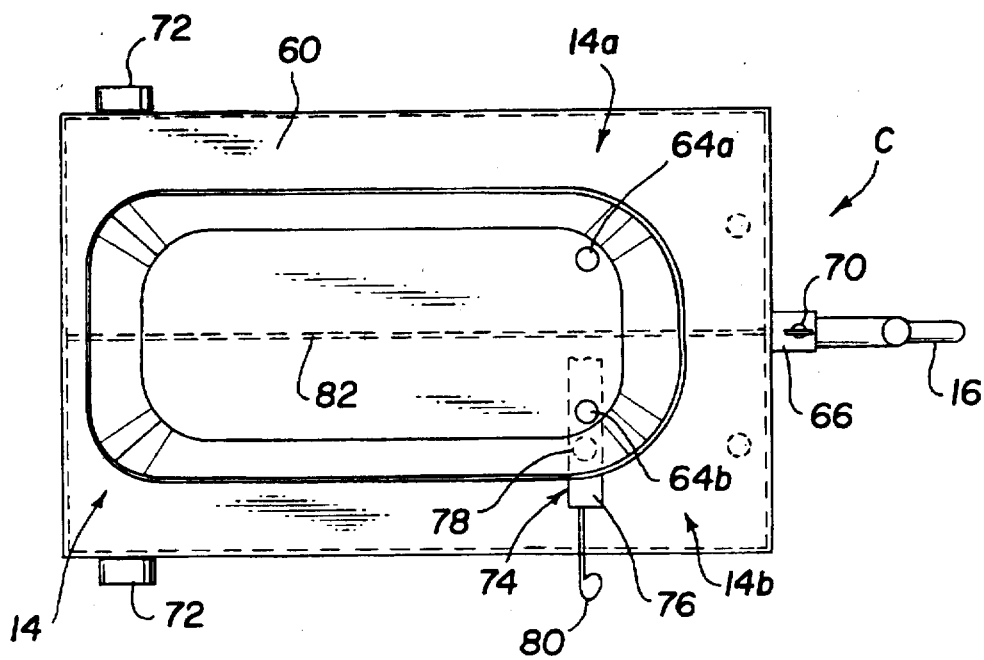
FIG. 6 is a top view of the transportable fluid lubricant drain container.

It is also preferable that sealing means 74 be movable mounted with the body 68 of the container C for desirably sealing the opening or openings 64a and 64b in the upper surface 60 of the container C. The seal 74 would seal the openings 64a and 64b in the upper surface 60 when the draining operation is completed. In FIG. 6 a slide 76 having a hole 78 therethrough can be moved between an open and a closed position to seal the hole 64a or 64b leading into the interior reservoir 14a and 14b respectively of the oil container C. A pull ring 80 for use by the operator is attached to the sliding seal 76.

FIG. 6 shows that the transportable drain container C may be formed having more than one inner reservoir 14a and 14b separated by panel 82 for the holding of the used oil. The upper surface 60 of the drain container C is formed having a pan 62 that directs the flow of the oil toward the openings 64a or 64b in the upper surface 60 through which the oil flows into one or the other inner reservoir 14a or 14b.

The composition for the body 68 of the drain container C should be chosen to be compatible with the chemical nature of the used oil and to withstand other conditions such as the heat of the oil removed from the engine M.

C. Flow Filter

As pan of the oil changing system, a flow filter F of the present invention is adapted from a known type of oil filter for mounting on a motor F of the type that includes an outer housing 84 containing known types of filter elements 85, such as a folded paper filter 86 and a tube 88. The housing 84 has at least one main opening 90 therethrough that is adapted for mounting the filter F on the motor M in the oil or lubricant circulation path. The main opening 90 communicates the flowing lubricant between the lubricant using device V and the filter elements 85.

Figure 9:
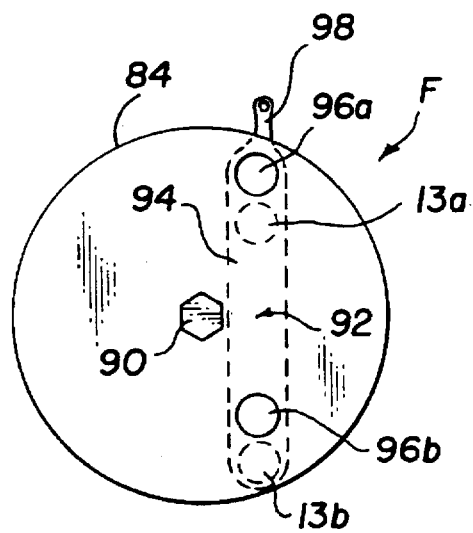
FIG. 9 is an alternative configuration of a flow filter showing a slidable sealing mechanism.
Figure 10:
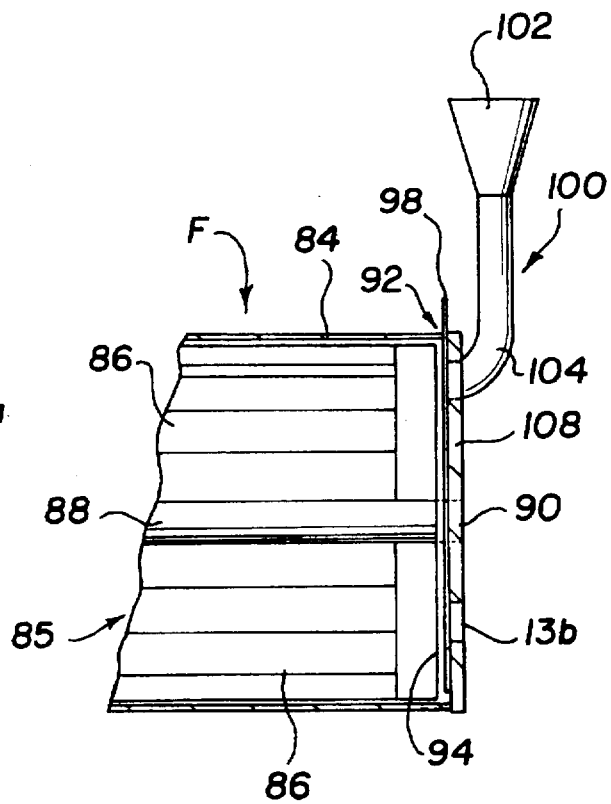
FIG. 10 is a partial cross sectional view of a flow filter having openings for flushing the filter elements.

A plurality of sealable openings 13a and 13b are formed in the housing 84 to pass a desired liquid solvent compatible with the lubricant in the motor M that originally passed through the filter elements 85 contained in the housing 84. Sealing means 92 for sealing selected sealable openings 13a and 13b in the housing 84 is coupled to the sealable openings 13a and 13b to shut off undesired openings in the housing 84 while the filter F is mounted on the lubricant using device V. Such seal 92 is shown in FIG. 9 to be a slide 94 having one or more holes 96a and 96b therethrough. A cable or grip 98 extends from the slide 94 to assist the operator in moving the slide 94 in an out of the open and closed positions. The open position for the embodiment of FIG. 9 would have the holes 13a and 13b in the housing 84 in alignment with the holes 96a and 96b, respectively, in the slidable sealing means 92.

The operator passes the selected solvent through the sealable openings to back-flush or cleanse a used filter element of undesired debris.

Preferably, a filler means 100 is connected with at least one sealable opening 13a or 13b for guiding the liquid solvent into the sealable opening 13a or 13b. Typically, the filler 100 includes a funnel portion 102 and flexible tube portion 104 extending between the funnel 102 and one of the sealable openings 13a or 13b. An exit tube 106 (FIG. 8) leads from opening 13b and may direct the exiting solvent from the cleansing operation of the filter F to storage in the transportable drain container C above.

Depending on the choice of design, the present filter F may have the sealable openings 13a and 13b located in the filter face 108 adjacent to the motor M when the filter F is mounted on the motor M. Alternatively, the sealable openings 13a and 13b maybe located on an opposite face of the filter F allowing for flushing of the filter F while the filter F is installed on the motor M.

Figure 8:
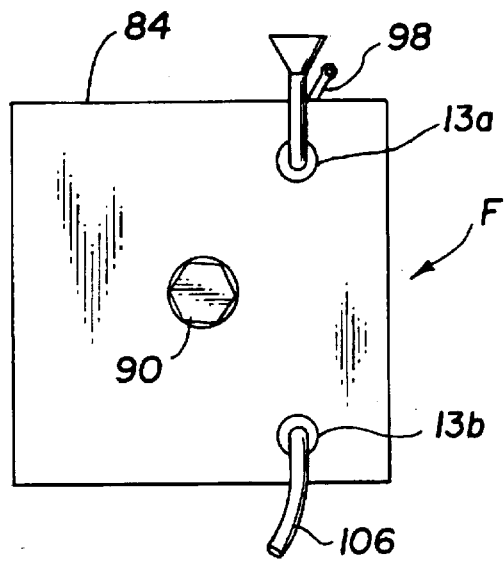
FIG. 8 is a top view of a flow filter adapted for flushing of the filter elements.

FIG. 8 shows an oil filter F of the present invention with a housing 84 having a square cross section. FIG. 9 shows a filter F with the present invention with a housing 84 having a circular cross-section.

D. Operation

In operation of the present invention for changing a fluid lubricant from a lubricant using device, such as a motored vehicle V, having a drain hole 12 through which the fluid lubricant may flow, first the operator identifies the vehicle type V. The handle 16 on the drain container C is adjusted relative to the body 68 with coupling 66 and nut 70 such that drain container C is correctly positioned beneath the drain hole 12 when the handle 16 engages the desired location on the vehicle V, such as the front bumper 20. The drain container C is then pushed beneath the vehicle V until the handle 16 engages the vehicle V. This positions the drain hole 12 of the motor M above a fluid collecting reservoir 14 such that the fluid collecting reservoir 14 is beneath the drain hole 12 in the lubricant using device V.

Then, the operator controllably opens the valve 24 mounted in a passageway 22 through the removable drain plug P that is mounted in the drain hole 12 of the motor M to permit the flow of the fluid lubricant out of the motor M and into the fluid collecting reservoir 14 positioned beneath. The valve 24 can be operated remotely either by activation of the solenoid 50 with valve body 51, by activation of the switch 46 that powers the motor 42 to mechanically open the valve 24 in the drain plug P, or by positioning a magnet 58 to disengage the magnetically operable valve 54 from the closed position.

The operator, generally when the oil is completely drained from the motor M, closes the valve means 24 to seal the passageway 22 in the drain plug P from leakage of the fluid lubricant through the drain plug passageway 22. Alternatively, the timer 48 included with the electric control circuit has been preset for a period of time considered to be typical of the length of time necessary to completely drain the vehicle. Once the preset schedule is complete, the timer 48 then acts to close the valve 24.

Finally, the vehicle V or the transportable oil drain container C is repositioned to permit normal operation of the vehicle V.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A flow filter adapted for mounting on a lubricant using device of the type including a housing containing filter elements, the housing having at least one opening therethrough adapted for mounting on the lubricant using device, the opening communicating the flowing lubricant between the lubricant using device and the filter elements, the improvement comprising:

a plurality of sealable openings in a face of the housing adjacent to the lubricant using device to pass a desired liquid solvent through the filter elements contained in the housing; and, sealing means for sealing selected sealable openings in the housing to shut off undesired openings in the housing while the filter is mounted on the lubricant using device;

whereby the solvent passing through the sealable openings cleanses a used filter element of undesired debris.

2. The invention of claim 1 further including:

filler means connected with at least one of the sealable openings for guiding the liquid solvent into the sealable opening.

* * * * *